March 10, 1931.   R. A. KLOCK   1,795,563
POWER UNIT
Filed Dec. 22, 1925   2 Sheets-Sheet 1

INVENTOR
Raymond A. Klock
BY Gifford & Scull
his ATTORNEYS.

March 10, 1931.   R. A. KLOCK   1,795,563
POWER UNIT
Filed Dec. 22, 1925   2 Sheets-Sheet 2
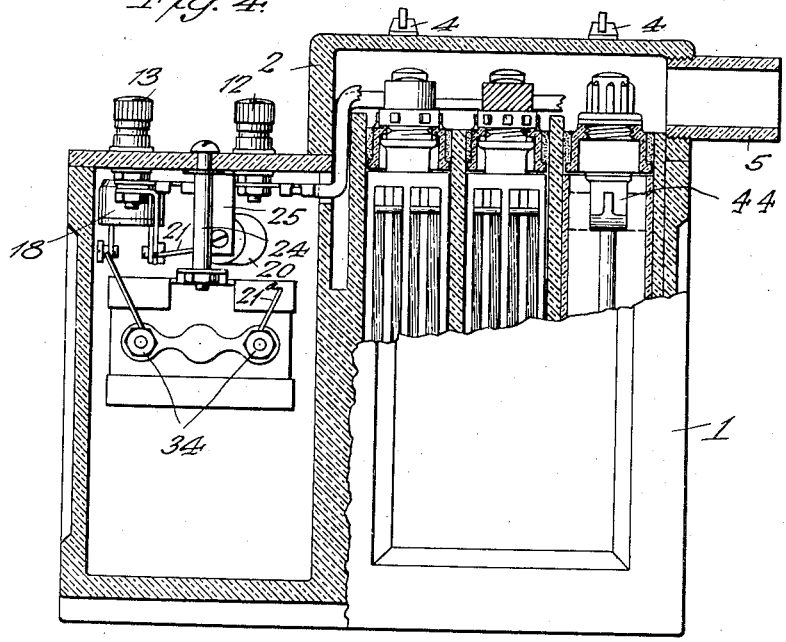
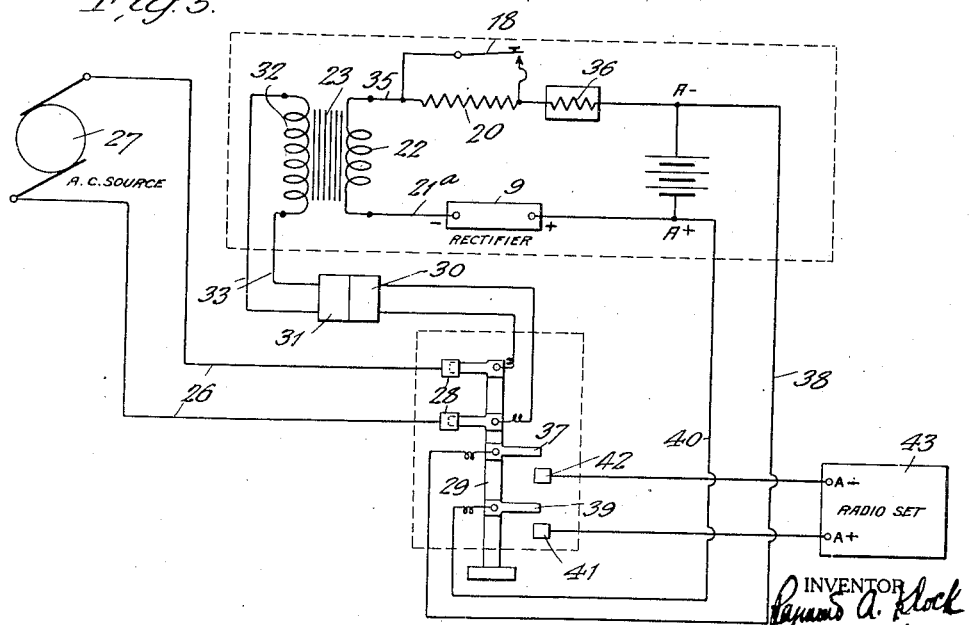

Patented Mar. 10, 1931

1,795,563

UNITED STATES PATENT OFFICE

RAYMOND A. KLOCK, OF CLOSTER, NEW JERSEY, ASSIGNOR, BY MESNE ASSIGNMENTS, TO GOULD STORAGE BATTERY CORPORATION, OF DEPEW, NEW YORK, A CORPORATION OF DELAWARE

POWER UNIT

Application filed December 22, 1925. Serial No. 77,166.

My invention relates to power units and particularly to such units for use in radio receiving apparatus.

Many attempts have been made to produce a power unit for the filaments of radio receivers which may be recharged in order to maintain the unit in proper condition to supply the lamp filaments at all times. Many types of rectifiers have been proposed and used heretofore for charging A-batteries for radios. I have devised a unit in which the A-battery, the rectifier and other essential parts, such as the transformer, resistances and switching mechanisms, are all combined into one unit. In most of the electrolytic rectifiers heretofore used, decomposition of the rectifier electrodes resulted so that after a certain period of operation it became necessary to replace the electrodes. This difficulty with such rectifiers is puzzling to the ordinary consumer and results in much dissatisfaction and in the practical elimination of such rectifiers for ordinary use.

I have simplified the unit from the consumer's standpoint by assembling together for the first time, so far as I know, an electrolytic rectifier and a storage battery in adjacent cells and in which the only act necessary on the part of the operator is to fill both the battery and the rectifier containers at intervals with distilled water. There is no decomposition or destruction of the rectifier electrodes, nor is there any destruction of the electrolyte except that which can be completely restored by the addition of distilled water. I have also simplified the unit by so proportioning the chambers of the battery and the rectifier that in the use of the unit in accordance with my invention, it periodically becomes necessary to fill both the rectifier unit and the battery unit with distilled water at substantially the same time; I have further arranged the rectifier unit so that when the electrolyte therein falls below a certain predetermined point no further charging of the battery is possible and this predetermined point is so arranged that the charging will be discontinued automatically before the electrolyte of the battery has decreased in volume sufficiently to expose the plates.

From the foregoing arrangements many advantages accrue from the consumer's point of view, which have never been secured in any device as heretofore constructed. These advantages briefly are:

First: A rectifying unit and a power unit are assembled in adjacent chambers, the rectifying and power units both being adapted to operate with an acid electrolyte.

Second: A rectifier is provided of such construction that its electrolyte may be replenished with exactly the same kind of liquid that is used to replenish the electrolyte of the battery.

Third: A rectifier is provided which acts to charge the battery and to maintain it in charged condition at all times and at the greatest possible efficiency.

Fourth: This device acts as a unit to transform house current into low voltage current for radios without the necessity of testing the parts and dealing with them separately. All that is required is periodic addition of distilled water.

Fifth: The device is adapted to be installed in closed cabinets without damage to metal parts. The heat generated by the transformer and the rectifier aids in the circulation to remove the fumes from the cover.

By assembling the parts as shown and described, the whole is corrosion free, as a result of which the parts are not destroyed and good contacts are secured and maintained between the various elements.

In most electrolytic rectifiers the liquid used heretofore has been of an alkaline character. Such a liquid is injurious to a storage battery and in turn such rectifiers degenerate quickly when placed in close proximity to a storage battery using sulphuric acid as the electrolyte, either because of the contact of the fumes with the rectifier parts, or in some instances because of actual entry of the battery electrolyte into the rectifier.

In prior electrolytic rectifiers the electrolyte evaporates very much faster than that of a battery of the proper capacity to be charged by such rectifier, because of the decomposition of the rectifier electrolyte instead of mere evaporation of one component thereof.

In such rectifiers one of the difficulties has been that the electrodes of the rectifier, as well as the electrolyte, decomposes and therefore they have a comparatively short life.

My invention will be better understood by reading the following description in connection with the accompanying drawings showing one form of apparatus embodying my invention, and in which—

Fig. 4 is a view on line 4—4 of Fig. 2; and

Fig. 5 is a diagrammatic layout of the electrical wiring.

Figure 1:
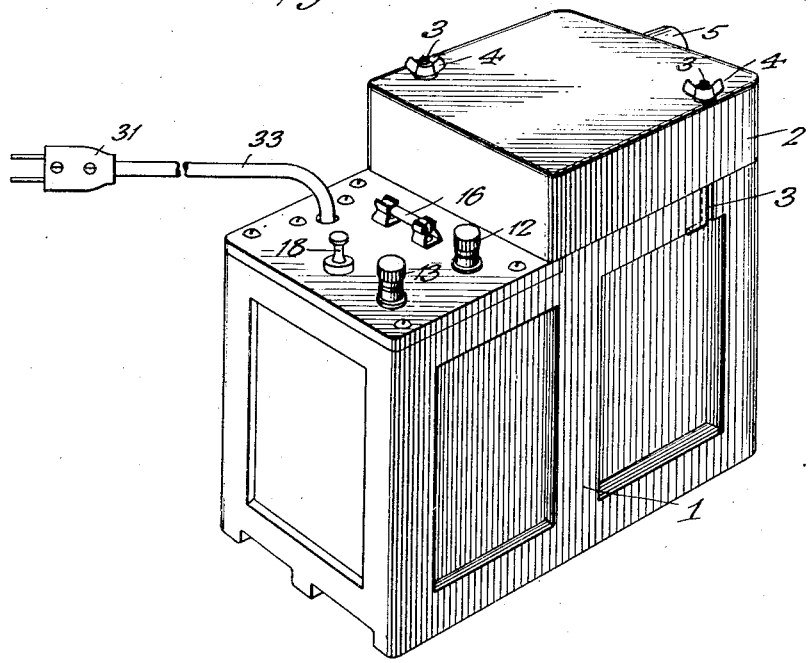
Fig. 1 shows a perspective view of one of the units.

Referring to the drawings, the device comprises a container 1 having a cover 2 held in place over the battery and rectifier by the members 3 which engage the casing 1 and the nuts 4 which engage the cover. An outlet 5 from the cover is provided which extends through the usual console or cabinet to discharge the gases from the electrolyte from the battery and rectifier to the outside atmosphere, thus protecting the metal parts of any other mechanism, such as a phonograph in the cabinet.

Figure 2:
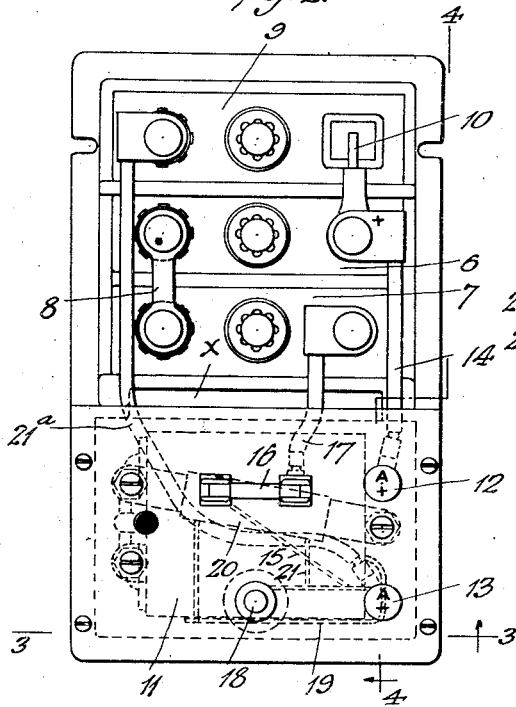
Fig. 2 is a plan view of the unit with the cover removed.
Figure 3:
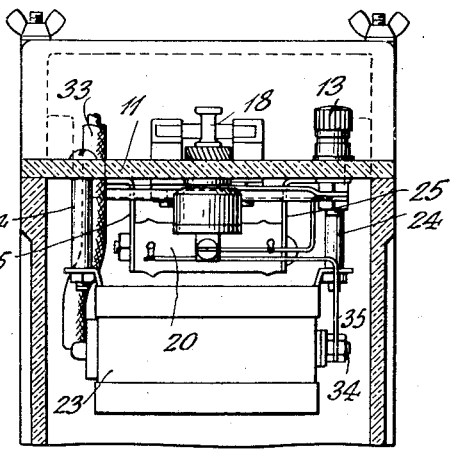
Fig. 3 is a view on line 3—3 of Fig. 2.

As shown in Fig. 2, the battery cells 6 and 7 are connected in series by the usual lead strap 8 and a rectifier 9 which may have electrodes of lead and tantalum is connected with the positive side of the battery by a lead strap 10. A terminal plate 11 is provided and carries the terminals 12 and 13. The terminal 12 is connected to the positive side of the battery by a wire 14 and the terminal 13 is connected with the negative side of the battery through the conductor 15, fuse 16 and conductor 17. The terminal 13 also connects with one side of the switch 18 by a wire 19, which in turn is connected to one end of a resistance 20. The other end of the resistance 20 connects with the other side of the switch by a wire 21, which side of the switch is in turn connected with one terminal of the secondary 22 of the transformer 23, as shown in Fig. 5. The terminal 13 is also connected directly with one side of the rectifier by a wire 21$^a$.

The transformer 23 is supported from the switch plate 11 by bolts 24 and the resistance 20 is supported from the switch plate by the brackets 25. A pair of conductors 26 lead from any suitable source, such as a generator 27 (Fig. 5) with the ordinary lamp socket, through terminals 28 of a switch 29 to a socket 30. The plug 31 is connected to the primary 32 of the transformer through wires 33. The secondary of the transformer is brought out through terimnals 34 and one of said terminals connects directly with the rectifier 9 through wire 21$^a$ and the other side connects with the switch 18 through the wire 35.

It will be noted that in the partition of the container 1 between the battery and the transformer compartment there is a space or well X. This well is provided for two purposes, one of which is to provide a space for the wires 14, 17 and 21$^a$ to pass through their connection with the battery into the transformer compartment and underneath the cover 2. The other purpose served by this well is that it acts to catch any of the battery electrolyte which might by accident spill on top of the battery or rectifier, and prevents the acids from getting into contact with the metal parts of the device in the transformer compartment.

As shown in Fig. 5, a second resistance 36 is connected in series with the resistance 20, and in turn is connected with the negative side of the battery. The battery negative is connected to the switch contact 37 through a wire 38 and the battery positive is connected with the switch contact 39 through the wire 40. Switch contacts 41 and 42 are in turn connected, respectively, to the A+ and A— contacts on the radio set 43.

Ordinarily the switch mechanism 29 is separate from the apparatus shown in Figs. 1 to 4 and may take any desired form.

By reference to Fig. 5, it will be noted that with the parts in the positions shown the transformer is connected with the source through contact 28 and that the battery is being charged with the resistances 20 and 36 in series with the rectifier. The adjustment of the resistances is such that what may be termed a trickle charge is supplied to the battery ordinarily sufficient to maintain the battery in proper condition. The switch 29 is so arranged and connected that when the battery is on charge the radio set is disconnected and, as will be seen by reference to Fig. 5, when the switch is pulled downwardly, the contact 28 will be broken and contacts 37 and 39 will engage the contacts 42 and 41, respectively. This shift in connections acts to disconnect the transformer from the source and thereby cut off the charging of the battery and at the same time connect the battery onto the receiving set. If the receiving set is used sufficiently to discharge the battery at a faster rate than the same is charged, the battery will become depleted in time and it therefore becomes advisable to increase the rate of charge to replenish the loss. This is accomplished by operating the switch 18 which short-circuits the resistance 20 and thereby increases the rate of charge to the battery. This condition may be maintained for a sufficient length of time to bring the battery back to full charge, whereupon the switch 18 will be open and the arrangement continued in its mode of operation.

By reference to Fig. 4, it will be noted that the lead element 44 of the rectifier is so located that when the electrolyte level falls below a certain point, to wit, below the lead element, the charging of the battery ceases because of the open circuit produced thereby. This arrangement is provided to safeguard against the possibility of damaging the battery plates which will be caused by attempting to charge the same when the electrolyte and the battery electrolyte are so low as to cause a simultaneous exposure of the plates of the battery and rectifier. As stated at the beginning of this specification, the rectifier chamber and the battery chamber are so proportioned with respect to the functions of the rectifier and the battery that the rectifier electrolyte and the battery electrolyte should normally be replaced or replenished at substantially the same times. That is to say, if these two chambers are filled to the proper extent at the beginning of operation it will usually be necessary to replenish the electrolyte in the two by the addition of distilled water at the same time. If for any reason the operator should neglect to add distilled water, there will come a time in the operation when the rectifier will cease its operation to charge the battery. The battery will then become exhausted and the operator will discover the difficulty and add the distilled water to both the rectifier and the battery. Since there is only slight evaporation of the battery electrolyte except when the battery is being charged, it will be apparent that there will not be any such amount of exposure of the battery plates as to damage them because the evaporation of the battery electrolyte will substantially cease before this condition takes place.

From all of the foregoing, it will therefore be apparent that I have provided a unit in which the parts have been so coordinated as to maintain the power supply in prime condition at all times; that this condition is maintained automatically because as the radio set is switched on the rectifier is disconnected and when the radio is switched off the rectifier is automatically connected to keep the battery charged; that the battery and rectifier chambers have been so coordinated relatively that the rectifier acts indirectly to protect the battery against damage due to the failure to add water; that the same type of electrolyte is used in the rectifier as in the battery, resulting in the simplification of maintenance and the removal of the likelihood of damage by mistake on the part of the operator, which would likely occur if two different kinds of liquid were added to the battery and the rectifier; that because of the direct transformation of energy by the electrolytic rectifier this unit is much more efficient, at the low current rates employed in the trickle charge, than those units using auxiliary circuits in the rectifier, as for example, those using a bulb rectifier in which the filament must be lighted to make the bulb rectify.

In most uses of such a device, such as radio, a direct current of constant voltage is of first importance. The employment of a low continuous charge, as described, insures the delivery of substantially the same voltage at all times. The rheostat of the radio set when being operated by one of these devices is normally set in one position and remains there so long as the unit is supplying the proper voltage. Therefore when it becomes necessary to adjust the rheostat to bring the filament voltage up, the operator is advised that the push-pull switch should be operated to increase the rate of charge to bring the unit back to normalcy. This enables the most ignorant operator to keep the unit in normal condition without any of the testing instruments usually considered necessary for the proper care of storage batteries. The corrosive gases from the battery and rectifier are trapped by the cover and removed from the device thereby avoiding corrosion of the terminals and the entire mechanism is enclosed in a unitary container with means provided for preventing injury to the parts in the transformer compartment by the accidental splashing over of the electrolyte from the battery compartment. Other advantages will be apparent to those skilled in the art.

I claim:

1. A power unit comprising a container, battery chambers therein, a rectifier chamber therein, a battery in said battery chambers, a rectifier in said rectifier chamber, electrolytes for said battery and said rectifier adapted to be replenished by the addition of water only, said battery and rectifier chambers being so proportioned relatively that their electrolytes require replenishing at substantially the same time.

2. A power unit comprising a container, battery chambers therein, a rectifier chamber therein, a battery in said battery chambers, a rectifier in said rectifier chamber, acid electrolytes for said battery and said rectifier adapted to be replenished by the addition of water only, said battery and rectifier chambers being so proportioned relatively that their electrolytes require replenishing at substantially the same time, and means whereby the battery may be charged through the rectifier.

3. A power unit comprising a container, a battery therein, a rectifier chamber therein, sulphuric acid electrolytes for the battery and the rectifier, the container having openings through which water may be supplied to said battery and rectifier, and means whereby said rectifier is rendered inoperative to charge said battery when the electrolyte of the rectifier falls below a predetermined point.

4. A power unit comprising a container having battery and rectifier chambers therein, battery electrodes and sulphuric acid electrolyte in said battery chamber, tantalum and lead electrodes and sulphuric acid electrolyte in said rectifier chamber, a transformer compartment adjacent the battery chamber, a transformer in said compartment, and a well between said transformer compartment and said battery chamber to prevent the transfer of electrolyte between the battery chamber and transformer compartment.

5. A power unit comprising a container, three chambers therein, battery plates and electrolyte in the center chamber, an electrolytic rectifier in one end chamber, a transformer in the other end chamber, a terminal plate covering the transformer chamber and a ventilated cover for the battery and rectifier.

6. A power unit comprising a container, a battery therein and an electrolytic rectifier therein connected with said battery, said rectifier having one electrode so positioned that upon the dropping of the electrolyte thereof below a predetermined point said rectifier ceases to function, said predetermined point being also above the point to which the battery electrolyte may safely drop.

RAYMOND A. KLOCK.